(12) United States Patent
Graves et al.

(10) Patent No.: US 9,973,274 B1
(45) Date of Patent: May 15, 2018

(54) FAST TRACKING FREE SPACE OPTICAL MODULE

(71) Applicant: SA Photonics, Inc., Los Gatos, CA (US)

(72) Inventors: J. Elon Graves, Los Gatos, CA (US); David Pechner, San Jose, CA (US); Andrew Olson, San Jose, CA (US)

(73) Assignee: SA Photonics, Inc., Los Gatos, CA (US)

( * ) Notice: Subject to any disclaimer, the term of this patent is extended or adjusted under 35 U.S.C. 154(b) by 0 days. days.

(21) Appl. No.: 15/289,034

(22) Filed: Oct. 7, 2016

Related U.S. Application Data

(60) Provisional application No. 62/238,637, filed on Oct. 7, 2015.

(51) Int. Cl.
*H04B 10/116* (2013.01)
*H04B 10/40* (2013.01)
*H04B 10/50* (2013.01)
*H04B 10/60* (2013.01)

(52) U.S. Cl.
CPC ............ *H04B 10/116* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 3,840,794 A | 10/1974 | Clement et al. | |
| 4,518,854 A | 5/1985 | Hutchin | |
| 4,635,299 A | 1/1987 | MacGovern | |
| 5,465,170 A | 11/1995 | Arimoto | |
| 5,477,550 A | 12/1995 | Crisler et al. | |
| 6,097,522 A | 8/2000 | Maerki et al. | |
| 6,141,128 A | 10/2000 | Korevaar et al. | |
| 6,469,815 B1 | 10/2002 | Poon et al. | |
| 6,535,314 B1 | 3/2003 | Mendenhall et al. | |
| 6,674,974 B1 | 1/2004 | Stieger et al. | |
| 6,683,850 B1 | 1/2004 | Dunning et al. | |
| 6,721,510 B2 | 4/2004 | Graves et al. | |
| 6,804,422 B1 | 10/2004 | Bajorins et al. | |
| 6,865,034 B1 | 3/2005 | Willis | |
| 7,277,644 B2 | 10/2007 | Johnson et al. | |
| 7,406,263 B2 | 7/2008 | Graves et al. | |
| 7,437,077 B2 | 10/2008 | Wirth et al. | |
| 7,505,695 B2 | 3/2009 | Sugihara et al. | |
| 7,551,121 B1 | 6/2009 | O'Connell et al. | |
| 7,809,278 B2 | 10/2010 | Morris et al. | |
| 7,835,387 B2 | 11/2010 | Agazzi et al. | |

(Continued)

FOREIGN PATENT DOCUMENTS

EP    1806858 A1    7/2007

OTHER PUBLICATIONS

U.S. Appl. No. 15/243,858, filed Aug. 22, 2016, Inventors: J. Elon Graves et al.

(Continued)

*Primary Examiner* — Darren E Wolf

(74) *Attorney, Agent, or Firm* — Fenwick & West LLP

(57) ABSTRACT

A fast tracking module for use in free space optical communications includes a primary motion stage supporting receive optics, where the primary motion stage is configured to move the receive optic relative to an optical path.

17 Claims, 11 Drawing Sheets

(56) References Cited

U.S. PATENT DOCUMENTS

| | | |
|---|---|---|
| 8,260,146 B2 | 9/2012 | Graves |
| 8,525,091 B2 | 9/2013 | Cui et al. |
| 8,539,297 B1 | 9/2013 | Goyal et al. |
| 8,660,312 B2 | 2/2014 | Cui et al. |
| 8,942,562 B2 | 1/2015 | Pusarla et al. |
| 2001/0006210 A1 | 7/2001 | Yanagi et al. |
| 2002/0181055 A1 | 12/2002 | Christiansen et al. |
| 2004/0071398 A1 | 4/2004 | Pierce et al. |
| 2004/0071470 A1* | 4/2004 | Neff .............. H04B 10/112 398/129 |
| 2004/0086282 A1 | 5/2004 | Graves et al. |
| 2004/0233420 A1 | 11/2004 | Deflumere et al. |
| 2005/0100339 A1 | 5/2005 | Tegge, Jr. |
| 2005/0243004 A1* | 11/2005 | White ............. H01Q 1/1264 343/753 |
| 2007/0035855 A1 | 2/2007 | Dickensheets |
| 2007/0217795 A1 | 9/2007 | Otte |
| 2007/0290096 A1 | 12/2007 | Jenkins et al. |
| 2009/0213953 A1 | 8/2009 | Yang |
| 2011/0041041 A1 | 2/2011 | Kim |
| 2011/0149298 A1 | 6/2011 | Arieli et al. |
| 2012/0141144 A1 | 6/2012 | Cai et al. |
| 2012/0248347 A1 | 10/2012 | Renna et al. |
| 2013/0100792 A1 | 4/2013 | Nakamura |
| 2013/0107850 A1 | 5/2013 | Agiwal et al. |
| 2013/0156439 A1 | 6/2013 | Arnold et al. |
| 2014/0068357 A1 | 3/2014 | Georges et al. |
| 2015/0188628 A1 | 7/2015 | Chalfant, III et al. |
| 2015/0215040 A1 | 7/2015 | Dickson et al. |
| 2015/0215041 A1 | 7/2015 | Pechner |

OTHER PUBLICATIONS

U.S. Appl. No. 15/243,800, filed Aug. 22, 2016, Inventors: J. Elon Graves et al.
U.S. Appl. No. 62/208,561, filed Aug. 21, 2015, Inventors: Buzz Graves.
U.S. Appl. No. 62/208,565, filed Aug. 21, 2015, Inventors: Buzz Graves.
PCT International Search Report and Written Opinion, PCT Application No. PCT/US16/48086, dated Nov. 4, 2016, 7 pages.
PCT International Search Report and Written Opinion, PCT Application No. PCT/US16/48091, dated Nov. 15, 2016, 9 pages.
U.S. Appl. No. 62/238,637, filed Oct. 7, 2015.
U.S. Appl. No. 62/266,710, filed Dec. 14, 2015.
Sackinger, Eduard, Broadband Circuit for Optical Fiber Communication, 2002, Agere System, pp. 37-77.
Kiasaleh, Kamran, Hybrid ARO Receiver for Packet Communications over Free-Space Optical Channels, 2006, SPIE, pp. 1-12.
Yang et al., A Hybrid Automatic Repeat Request (HARO) with Turbo Codes in OFDM System, 2010, IEEE, pp. 1-4.
PCT International Search Report and Written Opinion, PCT Application No. PCT/US2015/013368, dated May 7, 2015, 12 pages.
U.S. Appl. No. 62/238,634, filed Oct. 7, 2015.

* cited by examiner

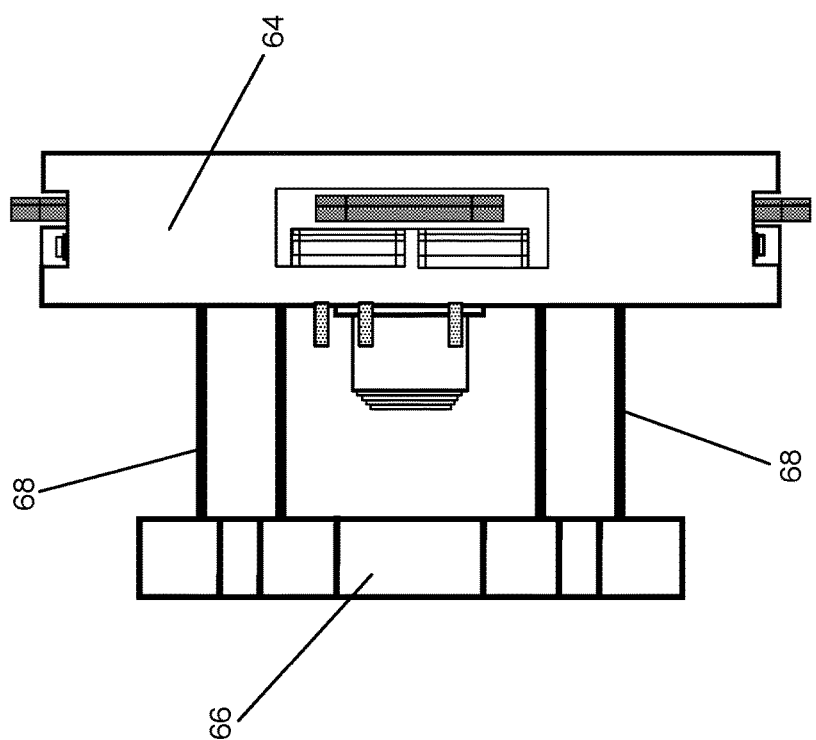

FAST TRACKING FREE SPACE OPTICAL MODULE

PRIORITY

This application claims priority to U.S. Application No. 62/238,637, filed Oct. 7, 2015, which is incorporated by reference in its entirety into this application.

BACKGROUND

In a two-node bi-directional Free Space Optical (FSO) communication system, the two FSO nodes exchange data encoded on optical carrier beams sent across an unobstructed line of sight (LOS) between the two nodes. As shown in FIG. 1, a conventional two-node bi-directional system is illustrated. As shown, a first node 2 and a second node 3 communicate by transmitting and receiving a signal 6, 7 sent between the nodes. The data can be encoded on the signals in any manner; a binary, on-off, exemplary signal is illustrated for simplicity. Each node has an optical output 4 for transmitting the desired signal 6, 7, and also an optical input 5 for receiving the transmitted signal. Once received, the internal electronics of the node can decode the signal and obtain the transmitted data.

The communication system only works if the transmit path of the first node is aligned with the receiving components of the second node. In order to optimize tracking, conventional systems have split the received beam into two paths: one for detection and one for alignment. FSO systems may also integrate the transmit and receive paths into a single aperture device. However, this may increase system complexity as it requires additional splitting of the beam from transmit source to receive detector. Also, the integration of beam paths invites misalignment that may adversely affect long range communication.

Traditionally, FSO systems include multiple optical components, including beam splitters and corresponding optics to be able to detect the beam angle and align the beam, or perform other functions. For example along the receive path, receive optics are included to detect the angle of the received beam as well as receive data from the received beam. Conventionally, the receive and transmit optical components (i.e. detector/source) are fixed relative to the node. Internal optics are then used to finely align the beam on the fixed optics. In an exemplary system, a fast steering mirror (FSM) may be used to position the beam in the desired orientation/alignment.

To provide the fine tuning in a fast and precise platform, therefore requires substantially more optics and system complexity. This introduces additional alignment errors and potential for drift that continually needs to be adjusted. Therefore, exemplary systems are large, costly, and inefficient for long term use.

The other alternative would be to move the terminal optic itself. However, given the weight, complexity, connectivity, and configuration of these optics, they generally cannot be moved easily, quickly, and precisely. The FSM therefore provides the faster and more precise response. Accordingly, conventional applications contemplate fixed terminal components, such as receive detector, and transmit source, while alignment and other path manipulation is performed by intervening optics.

SUMMARY

Exemplary embodiments described herein may provide fast highly fine positioning to microradian or less of accuracy, depending on the application. Exemplary embodiments may also provide additional alignment options beyond tip/tilt, such as permitting corrections for focus with Z motion.

Exemplary embodiments are configured to provide fine positioning of the terminal optic, including alignment optics and receive optics. In conventional systems, these optics are stationary, while other optics, such as FSM are used to position an optical beam on the terminal optic. In an exemplary embodiment, the receive optics may include transmit and receive optics. Exemplary embodiments of a Fast Tracking Module (FTM) comprise alignment optics, receive optics, tracking module, and combinations thereof.

In an exemplary embodiment, the alignment optics comprises a wave front sensor (WFS) with a plurality of cells. In an exemplary embodiment, the alignment optic is circumferentially positioned around the receive optic so that an alignment of the received optical path can be determined relative to the receive optic by comparing a ratio sensed between different cells of the alignment optic. Exemplary embodiments of the alignment optic include a quad cell, however any combination of wave front sensor comprising a plurality of regions or individual sensors may be used to achieve the benefits described herein, and are within the scope of the present invention. Exemplary embodiments of the alignment optic comprise a multi-cell sensor having a hole through a center of the cells. However, other configurations may be used to permit the alignment optics to determine the alignment of the received beam on the receive optic. Separate or integrated cell(s), sensor(s), or a combination thereof may be positioned in a plane perpendicular to the optical path around the receive optic.

In an exemplary embodiment, the receive optic comprises a multi-mode fiber (MMF) configured to transmit and receive light, thus integrating the Tx/Rx paths for the system. However, exemplary embodiments are not so limited. The receive optic may comprise a MMF for receive purposes only. The receive optic may also include a single mode fiber, a receiver detector/sensor, or other receive optics as desired for the specific application.

In an exemplary embodiment, the tracking module permits the alignment optics, receive optics, and a combination thereof to be positioned relative to the optical path. In an exemplary embodiment, the tracking module comprises a plurality of actuators to move the alignment optics and receive optics in a plane perpendicular to the optical path. Exemplary embodiments may permit movement parallel to the optical path. In an exemplary embodiment, the tracking module comprises a fixed link and motion stage, where the motion stage translates relative to the fixed link, and the fixed link is stationary relative to the FSO node, such as the node housing. One or more actuators may be positioned between the fixed link and motion stage to move the primary motion stage. The primary motion stage may comprise the alignment optic and/or receive optic.

DESCRIPTION OF FIGURES

FIGS. 6A-6B illustrate exemplary embodiments of an Fast Tracking Module (FTM). FIG. 6A illustrates a perspective view, while FIG. 6B illustrates a side, profile view.

DETAILED DESCRIPTION

Figure 1:
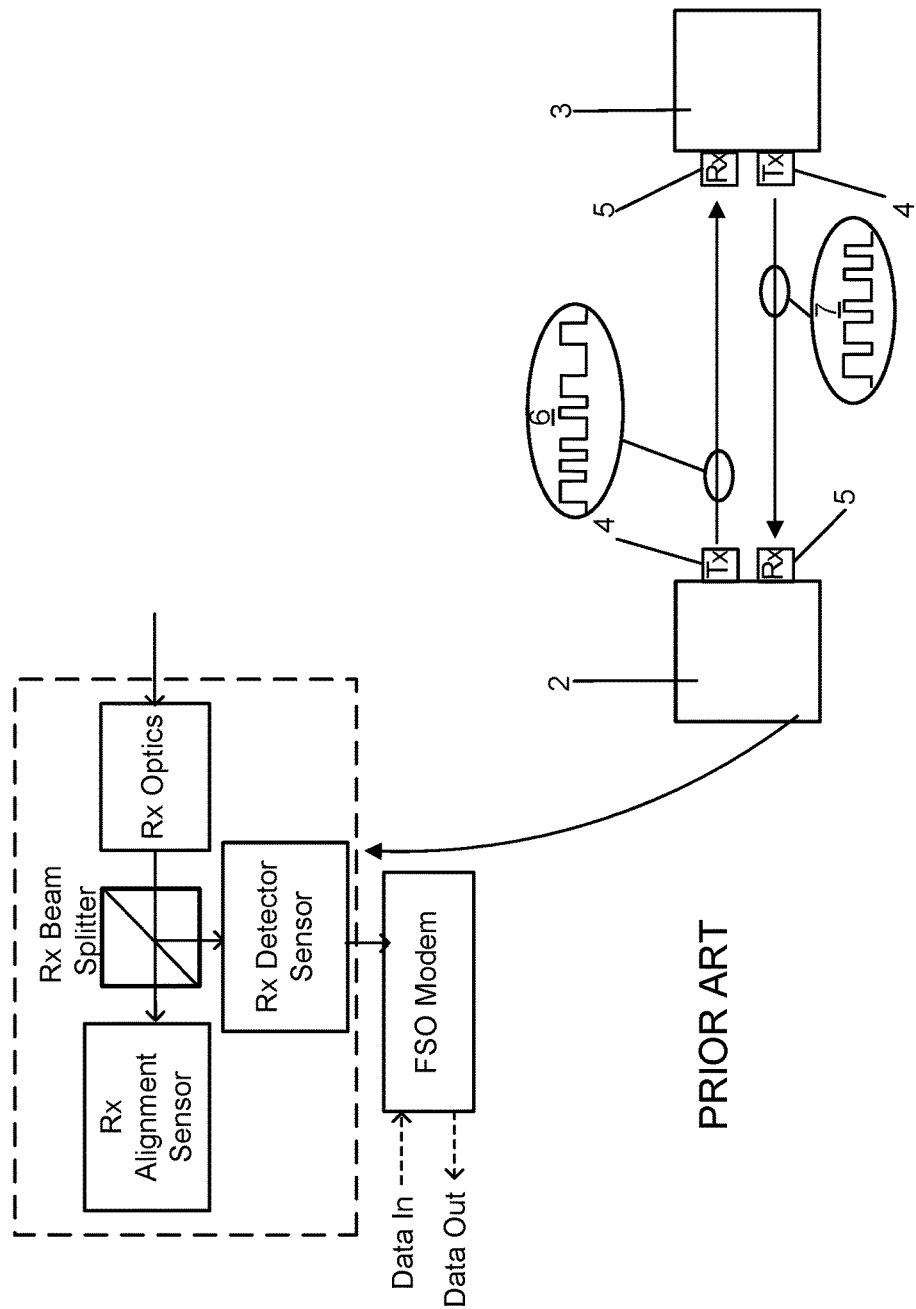
FIG. 1 illustrates a conventional two-node bi-directional free space optical (FSO) system.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

A fast tracking module (FTM) for use in free space optical communications is described herein including a primary motion stage supporting receive optics, wherein the primary motion stage is configured to move the receive optic relative to an optical path. Exemplary embodiments of the FTM are configured to translate the primary motion stage in a plane perpendicular to the optical path. The primary motion stage may support a receive optic at least partially circumscribed by a wave front sensor with any number of elements. Exemplary embodiments include a receive optic comprising a multi-mode fiber configured as an optical port for transmitting and receiving an optical signal using the same fiber. In an exemplary embodiment, the FTM has a wave front sensor comprises a plurality of cells for detecting light, configured to determine an alignment of a received optical signal on the wave front sensor.

In an exemplary embodiment, the primary motion stage is configured to translate in a plane perpendicular to a received optical path. This may be accomplished using a fixed stage, such that the primary motion stage is configured to move relative to the fixed stage. An intermediate stage may also be linked to the primary motion stage and linked to the fixed stage. The links of the fast tracking module may be configured to maintain the primary motion stage in a plane generally perpendicular to the received optical path. The primary motion stage or other FSO node component may be configured to move the focal plane relative to the primary motion stage along the optical path and perpendicular to the motion stage permitted by the FTM linked stages.

Exemplary embodiments described herein are in terms of common transmit/receive apertures. However, the invention is not so limited. Instead, exemplary embodiments may be used on separate transmit or receive paths in which the FTM is used on either or both of the optical Tx/Rx paths, such as, for example as an alignment and detector configuration for the received path only. Exemplary embodiments described herein are in terms of integrated systems for alignment and detection by integrating the WFS and MMF into a single console. However, the invention is not so limited. Instead, exemplary embodiments may be used to quickly and precisely position other Tx/Rx optics, such as the multi-mode fiber for receive, transmit, and combinations thereof only, without the alignment optics, including the WFS.

Figure 2:
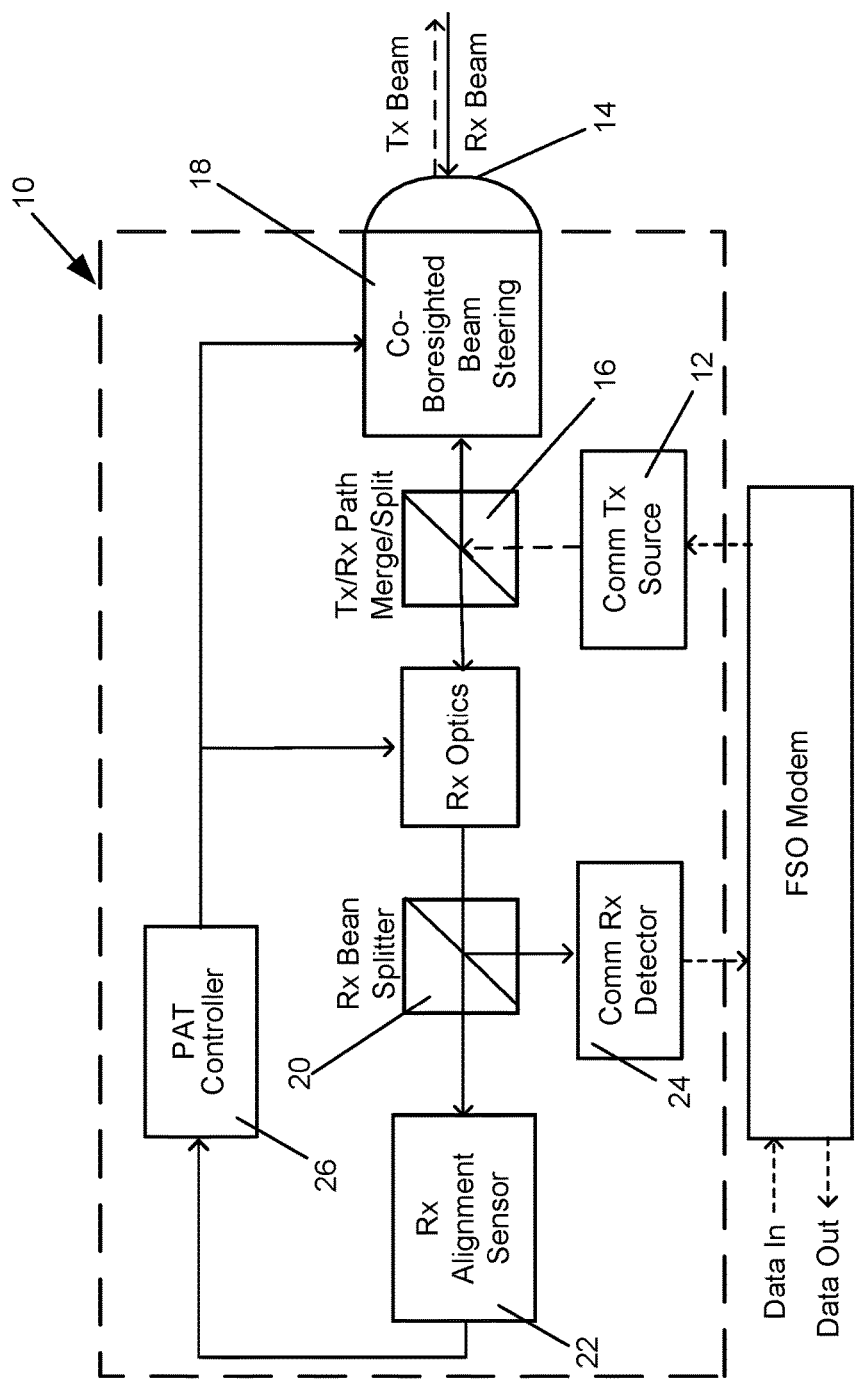
FIG. 2 illustrates an exemplary FSO unit providing a common optical path for the FSO transmit (Tx) and receive (Rx) beams through a common aperture.

FIG. 2 illustrates an exemplary FSO unit 10 providing a common optical path for the FSO transmit (Tx) and receive (Rx) beams through a common aperture. In an exemplary embodiment, a combination of beam steering optics including, but not limited to, beam splitters, prisms, mirrors, lenses, diffraction gratings, and any combination thereof, may be used to align the received beam with the transmit beam through a common aperture. The FSO unit 10 includes a transmitter source 12 in communication with the FSO modem that outputs an optical signal encoded with the desired data to transmit to a remote FSO unit. The optical transmit beam is directed out an aperture 14. One or more optical components may be used to steer 18 the beam along the desired path from the transmit source through the aperture 14. As shown, the beam is directed out of the aperture through a beam merge/splitter 16. The FSO unit also includes a receive alignment sensor 22 and receive detector 24. The Rx beam is split between these components by a beam splitter 20. Various components may communicate with to provide a feedback loop or be controlled by a PAT controller 26 to align the receive optics. Exemplary co-boresighted FSO nodes are disclosed in, for example, U.S. application Ser. No. 14/608,166, filed Jan. 28, 2015, titled "Data Retransmission for Atmospheric Free Space Optical Communication System", which is incorporated in its entirety herein.

Figure 3:
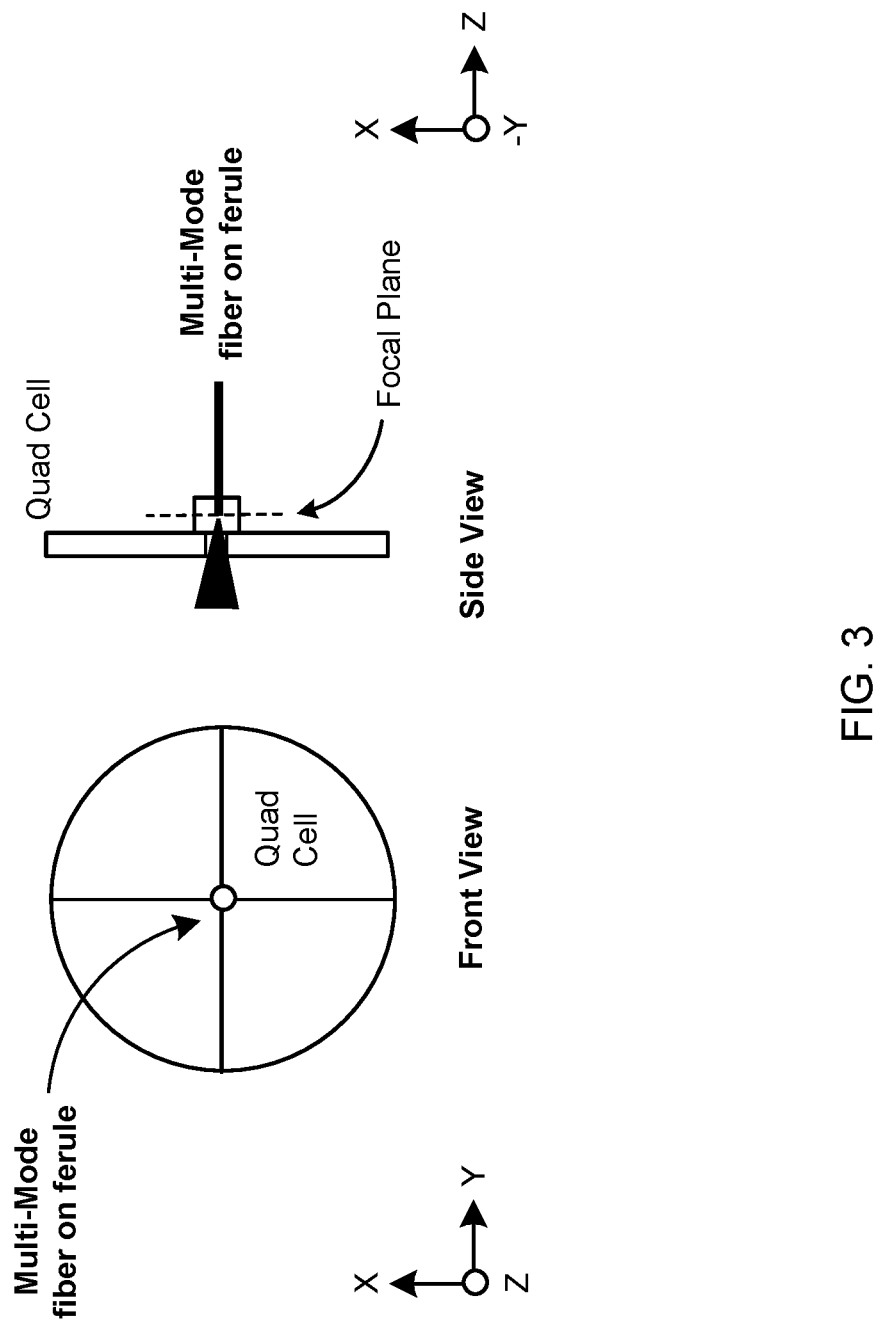
FIG. 3 illustrates an exemplary optical component configuration that permits the detector optics and the alignment optics to be integrated along the same beam path.
Figure 4:
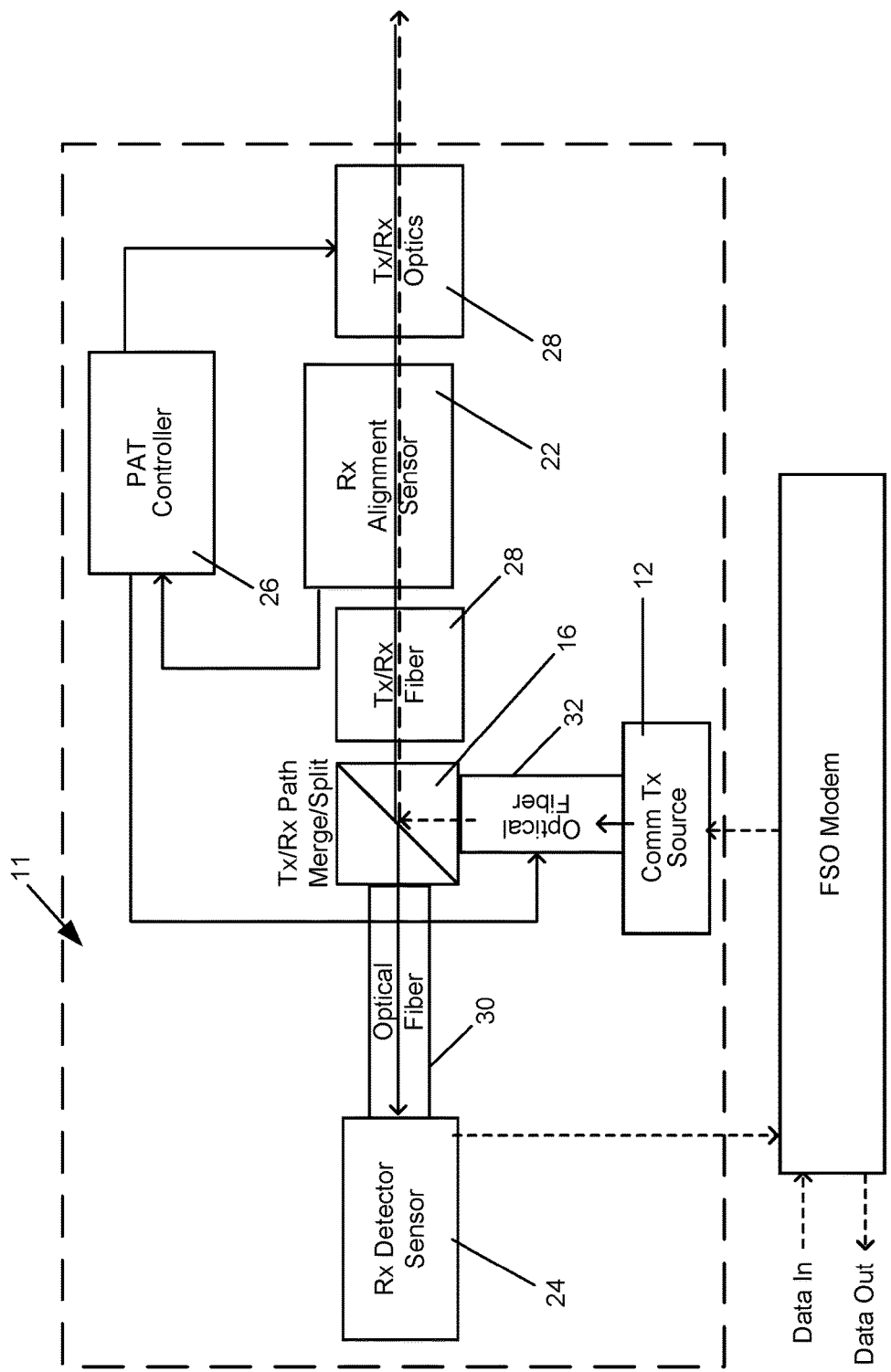
FIG. 4 illustrates an exemplary alignment sensor comprising a quad-cell with an interior aperture for simultaneously receiving/detecting a portion of the received light and passing another portion of the received light onto a receiver.

FIG. 3 illustrates an exemplary optical component configuration that permits the detector optics and the alignment optics to be integrated along the same beam path. FIG. 3 illustrates a co-boresighted FSO node in which the Tx and Rx signals traverse common transmit and receive optics 28 adjacent the FSO node aperture. Exemplary embodiments integrate an alignment sensor 22 into the optical path. In an exemplary embodiment, the alignment sensor 22 does not fully obstruct the optical path such that a portion of the light passes onto receiving optics. The receiving optics may be a detector or other optical components such as mirrors, lenses, diffractive elements, beam splitter, and combinations thereof. FIG. 4 illustrates an exemplary alignment sensor 22 comprising a quad-cell with an interior aperture for simultaneously receiving/detecting a portion of the received light and passing another portion of the received light onto a receiver. As shown, the receiver is a fiber 28, but could also include other optical components or free space. The light is then split at 16 into two separate receive and transmit paths to the detector 24 and transmit source 12, respectively. Fibers 30, 32 may be used to direct the light also, or may traverse free space. U.S. patent application Ser. No. 15/243, 800, filed Aug. 22, 2016, and titled "Free Space Optical (FSO) System", which is incorporated in its entirety herein, discloses exemplary FSO systems with an integrated alignment mechanism on the receive beam path. An exemplary embodiment described therein includes a wave front sensor comprising a free space in an interior region and a receiver within the free space of the wave front sensor. The wave front sensor may be a quad-cell that is used for beam alignment, while the receiver may be an optical fiber that is then used as a beam path for the internal navigation within the SFO node.

Closed loop beam tracking is performed in exemplary embodiments by using a wavefront sensor of any number of detector elements (e.g. cells). By nulling the incoming wavefront error and transmitting in the same direction, both FSO nodes will achieve the maximum optical coupling from end to end. This design uses a wavefront sensor with an optical path in the center to support Tx and Rx data transfer via a multi-mode fiber, while simultaneously being able to measure the incoming wavefront angle error. Note that this fiber coupled design insures Tx/Rx boresight, eliminating potential pointing errors between the Tx and Rx optical paths, and provides a robust design. Exemplary configurations of wave-front-sensor (WFS) using a quadcell and other multi-element configurations are described in co-pending, co-owned applications, U.S. Provisional Application 62/208,561, filed Aug. 21, 2015, and U.S. Provisional Application No. 62/208,565, filed Aug. 21, 2015, each of which is incorporated in its entirety herein.

An exemplary optics design consists of a two-element folded beam expander that impinges on a wavefront sensor with a multi-mode fiber at its center as shown in FIG. 4. As seen, the WFS 22 comprises a quadcell with a central aperture and sits slightly in front of the focal plane, with the multi-mode fiber 28 at the exact focal plane. However, the relative positions of these components may change, such that the WFS and terminal face of the multi-mode fiber are aligned in the same plane, or the terminal end of the fiber is positioned in front of the WFS. The design is a completely new concept for FSO systems and supports operations with a common optics design:

1. The center portion of the receive aperture is focused to the multi-mode fiber (exemplary receive optic); and
2. An outer ring portion of the receive aperture is incident on the WFS and is used to calculate the incoming wavefront angle (exemplary alignment optic).

In addition, by moving the WFS assembly in the X-Y plane, a fine beam steering/tracking mechanism can be introduced. This is referred to as a translation stage or Fast Tracking Module (FTM). Exemplary embodiments are described herein with compact voice coil actuators used to implement the WFS movement that provides up to +/−8 mm travel in the X and Y directions. However, other actuators may be used, and/or other translation stage configurations may be used.

Exemplary embodiments described herein may integrate components onto a platform which moves relative to the housing or FSO node to permit direct alignment of one or more beam paths. For example, as shown in FIG. 4, the alignment sensor 22 and receiving optical fiber 28 may be integrated together such that a platform containing these components may be moved together as an integrated unit. Conventionally, moving these components introduces additional problems with focus alignment. If the Tx/Rx fiber 28 is positioned at the focal point of the received beam, and then the Rx/Tx beam is moved to align the beam relative to the receive beam, the gimbal or actuator has to be precisely positioned so that translation does not result in movement of the fiber along the receive beam, or out of focus. Motion to align the fiber with the beam should be limited to a plane perpendicular to the receive path, or else suffer from focal misalignment.

Figure 5:
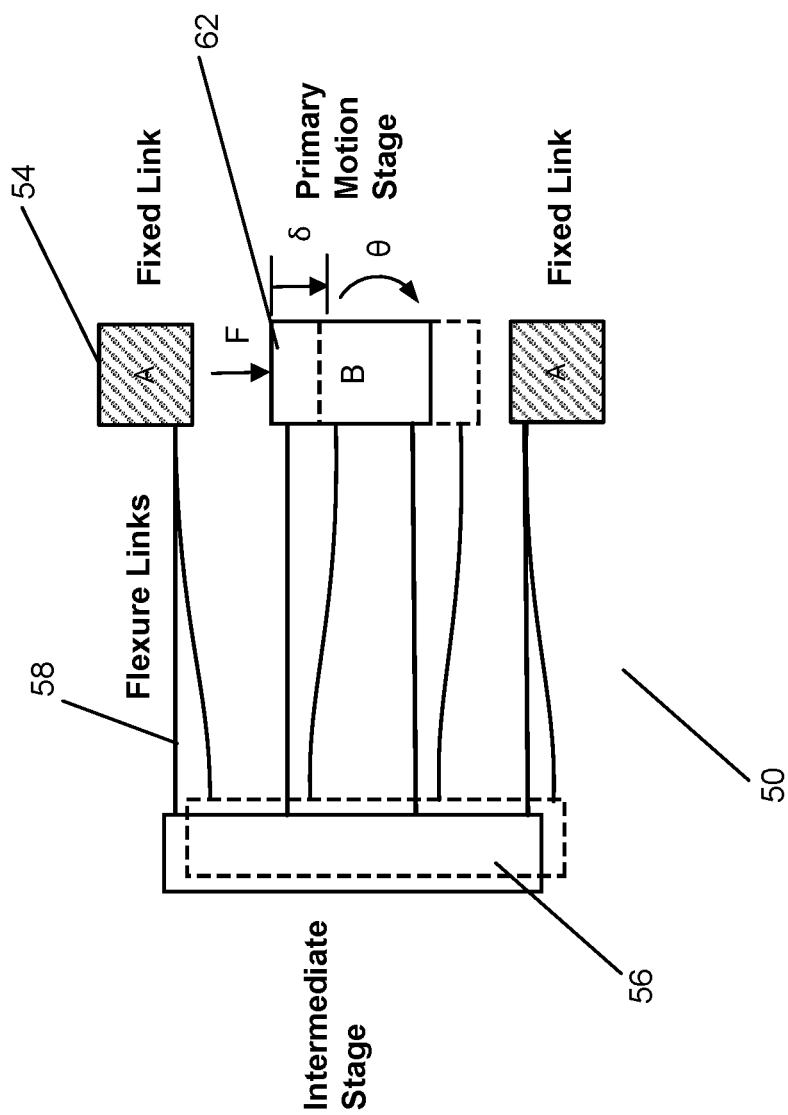
FIG. 5 illustrates an exemplary translation stage for moving receive optics for optical alignment.

FIG. 5 illustrates an exemplary translation stage for moving receive optics for optical alignment. Exemplary embodiments of the translation stage permits translation within a plane, while limiting motion in the z-direction, or along the receive beam path. Exemplary embodiments may therefore be aligned and positioned relative to the receive/transmit optical path to permit relative movement in a plane perpendicular to the optical path. As shown, a primary motion stage 52 may permit the relative movement. The primary motion stage 52 may support optical components, such as alignment sensor and/or receive/transmit fiber of FIG. 4. The translation stage 50 may also include fixed links 54 that are coupled to the FSO node and provide a stationary anchor of the translation platform to the FSO node. Positioning of the fixed links 54 relative to the transmit/receive beam can orient the primary motion stage 52, such that motion of the primary motion stage can be maintained or limited to a single perpendicular plane relative to the transmit/receive beams. The primary motion stage 52 is permitted to move relative to the fixed link 54 through flexure links 58 and/or intermediate stage 56. The flexure links 58 comprise fixed length connectors that limit the motion of the primary motion stage 52 out of the plane from the desired translational movement. As shown, the intermediate stage 56 and primary motion stage 52 may move relative to the fixed links 54 and each other. Motion of the primary motion stage may be accomplished through actuators connector to the primary motion stage, fixed link, intermediate stage, flexure links, FSO housing, and combinations thereof.

In an exemplary embodiment, fine beam steering may be accomplished by moving the very compact optics assembly (WFS and multi-mode fiber) laterally in the focal plan actuators. The mechanical design of this actuator is based on a double parallelogram flexure building block, which is shown in FIG. 5.

Figure 6A:
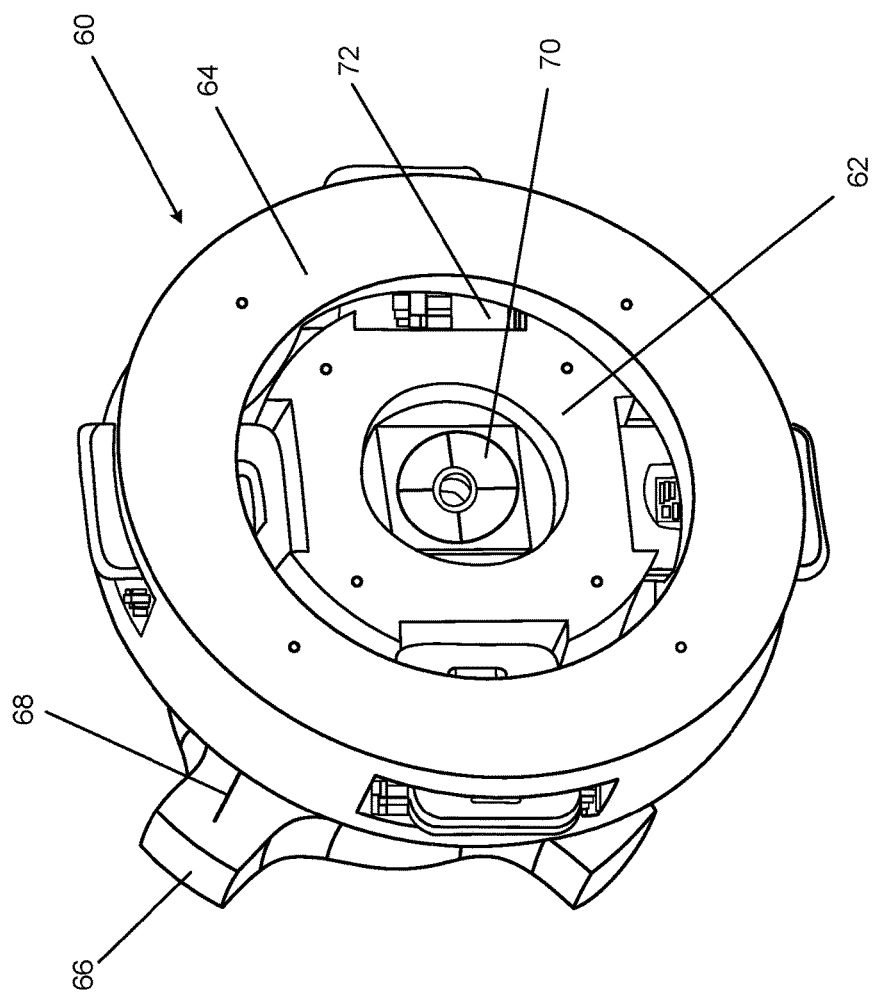

FIGS. 6A-6B illustrate exemplary embodiments of an Fast Tracking Module (FTM). FIG. 6A illustrates a perspective view, while FIG. 6B illustrates a side, profile view. High speed, fine beam steering is accomplished by moving the very compact optics assembly (wave front sensor and multi-mode fiber) laterally in the focal plane with compact actuators, such as voice coil actuators. The fine tracking system can operate with a closed loop bandwidth of ~50 Hz and is able to track fast, small angular movements with sub-microradian precision. In addition, by adding movement in the Z direction, the FTM can be used to implement an active fine-focus capability, adding robustness to potential aging or environmental changes.

FIGS. 6A-6B illustrate an exemplary FTM 60 having a primary motion stage 62, intermediate stage 66, and fixed stage 64, connected with flexure links 68. As shown, the fixed stage 64 includes an annular band in which flexure links coupled on opposing sides. The flexure links connect the motion stage to the intermediate stage and then to the fixed stage. As shown, four flexure links are used; however, different numbers of links may be used to achieve a desired translation control, speed, and stability. As shown, the exemplary flexure links 68 may include rods to allow motion in either the X or Y direction. The rods may be arranged in a manner that will reduce the potential for twisting when force is applied. The rods may also be configured to flex and permit relative motion between the fixed stage and the primary motion stage.

The FTM 60 may comprise a motion stage 62 where the WFS 70 and fiber are mounted. Between the fixed stage 64 and primary motion stage 62 may be a plurality of actuators. Exemplary actuators include compact voice coil actuators. 72. Exemplary actuators provide movement of the WFS/fiber of up to +/−8 mm travel in the X and Y directions. The coils of the FTM may mount on the motion stage. Since this is the moving stage, it is preferred to have a low mass so that it can be accelerated quickly with minimal force. The magnets of the FTM may be mounted in the fixed stage. The fixed stage may be made of magnetic steel to help with magnetic flux containment. The coils may be surrounded by steel in order to provide a flux path for the magnetic field. This steel enclosure may help keep the magnetic field lines perpendicular to the current path through the coil. The magnet pairs may be positioned such that opposing magnets or magnets in the same x or y direction are opposite in polarity so that the forces generated from the interaction with the coil are in the same direction. For example, the left and right coil and magnet pairs act in tandem to move the WFS up and down.

As illustrated in FIG. 6A, four flexural rods 68 are coupled to the fixed stage 64. The rods are positioned equidistantly around the fixed stage. Four additional flexure rods are coupled to the primary motion stage. The four additional flexure rods are positioned radially inside and are radially in line with the four flexural rods coupled to the fixed stage. As shown, four actuators are positioned between the fixed stage and the motion stage. The actuators are equidistantly arranged around the FTM. Each actuator is positioned between adjacent rods. The positioner may have a range of motion of +/−8 mm. Exemplary embodiments may also incorporate controlled movement in the Z direction to permit a fine focus capability. FIGS. 6A-6B illustrate a specific arrangement of components including the shape, position, and relative configuration of the fixed stage, intermediate stage, motion stage, flexure links, and actuators. However, this arrangement is exemplary only. Any number of actuators, links, and stages may be used. In an exemplary embodiment the intermediate stage is removed and pairs of flexural links are directly attached at terminal ends opposite the fixed stage. Other components may also be added, removed, integrated, separated, or combined in any form with any other embodiment described herein or as would be known to a person of skill in the art given the instant disclosure.

Exemplary embodiments of the FTM, as discussed in detail herein, may include a "quad cell with hole," a multimode fiber (MMF) ferule rigidly mounted to the quad cell, and four compact voice coil actuators (VCAs). The MMF fiber axis located at the center of the hole in the WFS allows the Tx cone exiting the MMF to project through the hole and into the collimation optics (that may be for example, an expander or collimator). Likewise, the incoming Rx light is focused by the same collimation optics for coupling into the MMF. The quad cell picks up Rx light incident on the outer ring-shaped portion of the Tx/Rx lens aperture, outside the ideal acceptance cone for coupling into the MMF.

In an exemplary embodiment, the MMF ferule and WFS are laterally displaced in the x-y plane perpendicular to the optical axis using the VCAs, which steers the Line of Sight (LOS) by x/f and y/f (f=focal length of the collimator). The high performance of the FTM afforded by the VCAs and low-mass ferule and quad cell provides the fine high-bandwidth portion of the overall LOS steering.

Closed loop beam tracking and pointing is accomplished by the use of a wavefront sensor 70. A challenge for a long distance FSO link is how the link is established (i.e. the acquisition process). One benefit of exemplary FTM designs described herein is the receive field-of-view on the WFS is very large (+/−3 degrees), which greatly reduces the required acquisition time. In this case, each node can spiral scan and only needs to illuminate the far end aperture. Assuming the initial pointing uncertainty is less than the receiver Field Of View (FOV), the receiver can detect the incident light. It is expected that the absolute pointing knowledge toward the far end node is known with a reasonably small error. Assuming a 1 mrad maximum pointing knowledge error toward the far end node, acquisition will occur in under 1 second. This is likely a worst case analysis since the pointing knowledge is likely known to better than 1 mrad.

Figure 7A:
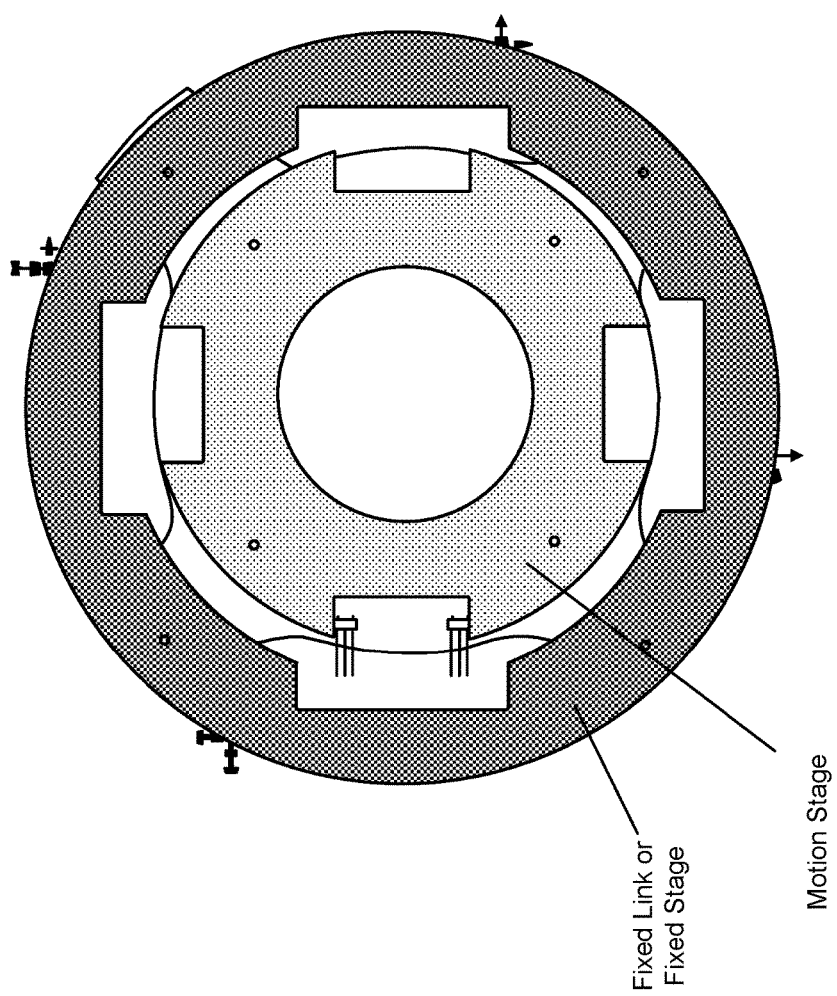
FIGS. 7A and 7B illustrate exemplary displacements of the motion stage relative to the fixed stage.
Figure 7B:
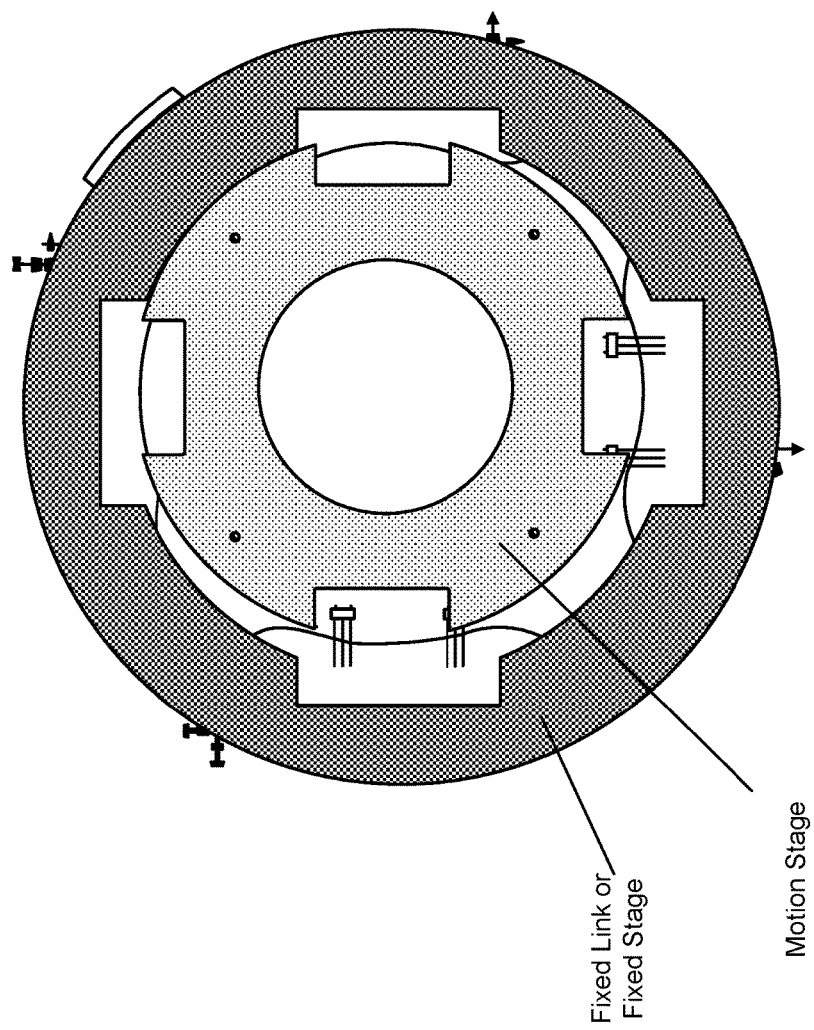

Exemplary embodiments of the flexure design allows for frictionless displacement in both the X and Y directions. FIGS. 7A and 7B illustrate exemplary displacements of the motion stage relative to the fixed stage. FIG. 7A illustrates an exemplary flexure displacement from an applied load in the X-direction with a displacement purely in the X-direction; while FIG. 7B illustrate an exemplary flexure displacement from the same applied load in both the X and Y directions with the motion stage experiencing a diagonal movement.

Figure 8:
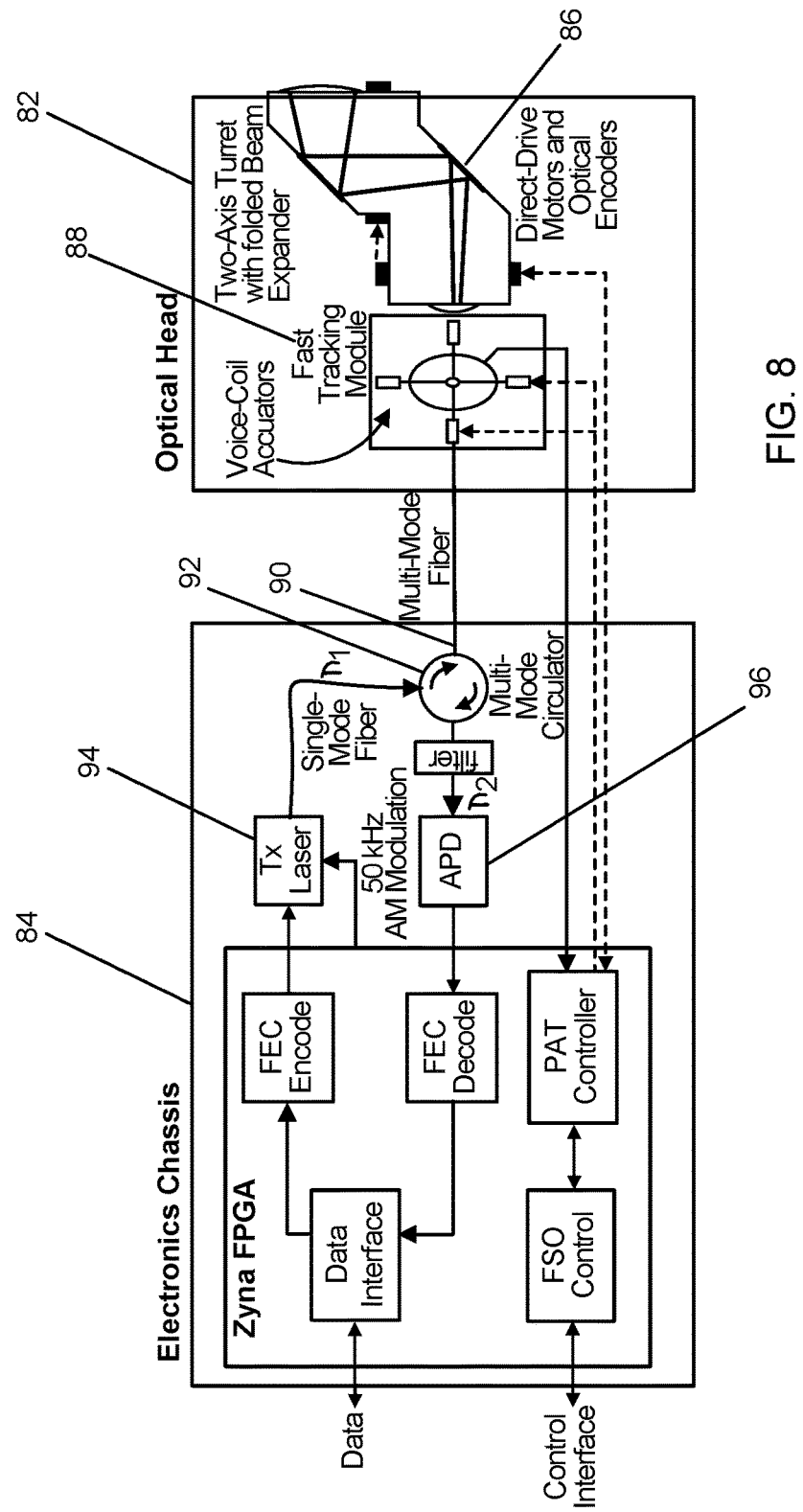
FIGS. 8 and 9 illustrate an exemplary chassis for use with the translation stages described herein.

FIG. 8 is an exemplary chassis for use with the translation stages described herein. The system may include separate components including the optical head 82 and the electronic chassis 84. As shown, a beam director 86 is adjacent the FTM 88 to direct the light from the FSO node aperture to the receive fiber 90. As shown, the additional optics including the splitter 92, transmit source 94 and receiver detector 96 are located on the electronic chassis 84, while the FTM 88 and beam director 86 are positioned on the optical head 82. Control, electrical, data, and/or power may connect the electronics chassis to the optical head for controlling the FTM and/or beam director. The optical fiber 90 similarly passes the optical signal from the optical head to and from the electronic chassis into the receiving and generating optics and corresponding opto-electronic and electronic components. As shown, the z direction focus may be achieved by controlling the motion of a lens on the beam director relative to the FTM.

A block diagram of an exemplary FSO terminal is shown in FIG. 8, which shows the system composed of an electronic processing chassis and separate optical head. Due to the architecture of the FSO terminal, these two modules can be either co-located or separated, simplifying integration. Also as shown, the system components may be incorporated in one or the other module to achieve any combination of benefits or functions. Therefore, the illustrated representations are exemplary only, and not limiting.

Figure 9:
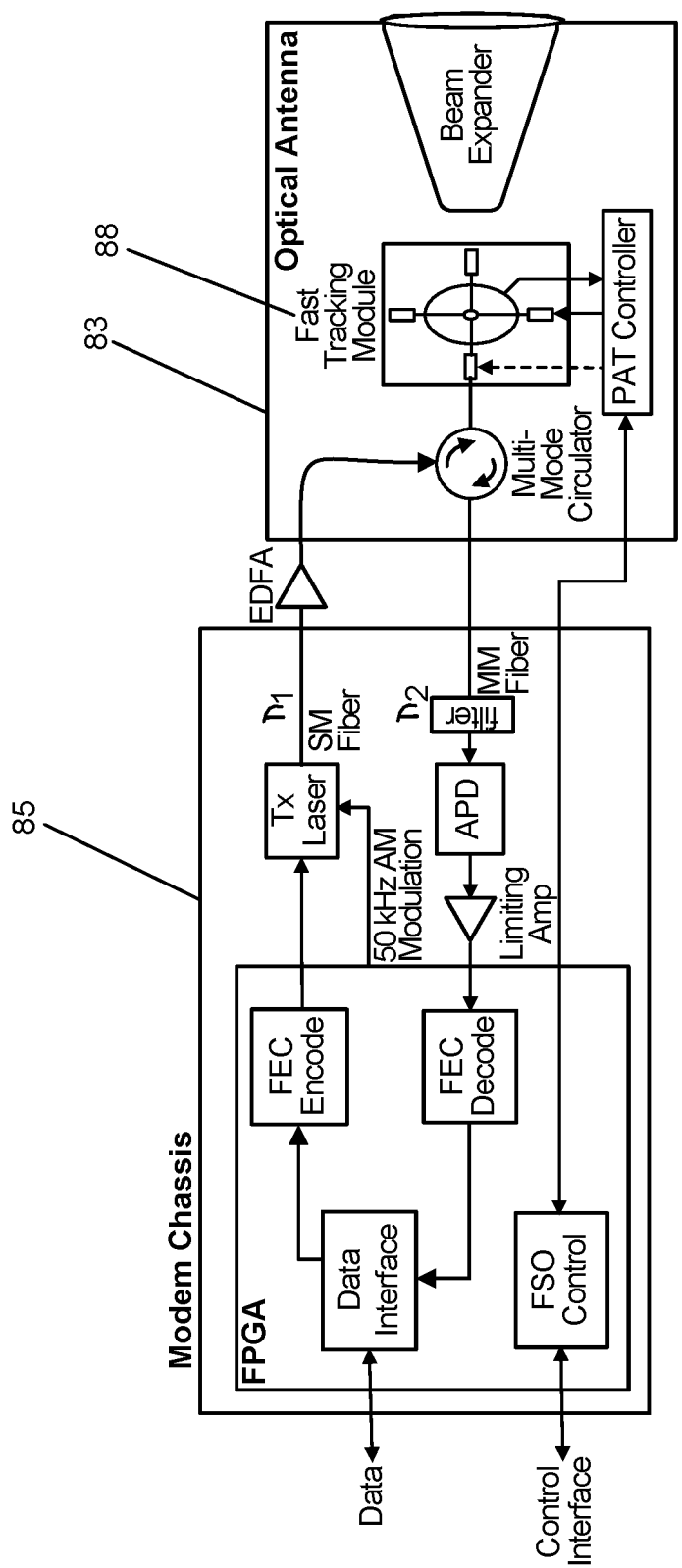

FIG. 9 is an exemplary chassis for use with the translation stages described herein. FIG. 9 is similar to FIG. 8, but illustrates the inclusion of different components between the chassis and the optical head. The configuration of FIG. 9 is an exemplary modem chassis 85 for use with an optical antenna 83. As shown, the optical separator 92 is moved from the chassis to the optical antenna along with the PAT controller for driving the actuators of the FTM. Exemplary embodiments may use different beam directors. As shown in FIG. 9, a beam expander is used. Different or additional beam forming, directing, filtering, distorting, or other optical components may be used with the system.

In an exemplary embodiment, the FTM may permit relative motion in the direction parallel to the optical axis for fine tune focus. For example, the objective lens may be moved relative to the WFS/MMF to control focus. The WFS may also be translated parallel to the optical axis through one or more actuators coupled to the WFS and/or MMF. Additional optics may also be incorporated into the system. For example, U.S. application Ser. No. 15/243,858, titled "Free Space Optical (FSO) System," filed Aug. 22, 2016, which is incorporated herein in its entirety, describes the incorporation of a diffractive element or other optical element to distort the receive beam to reduce alignment effects from atmospheric scintillation.

"Generally" is understood to include some error inherent in the alignment of the system as would be understood by a person of skill in the art. For example, exemplary embodiments are constrained in an x-y plan perpendicular to the received optical path a plurality of linear links. When these links flex over they will reduce the separation distance between the respective stages. However, this distance is within a design error for the optical system for the translational distances permitted in the perpendicular plane. For example, the maximum displacement in the x-y plane results in a z displacement within the alignment (focusing) error for the optical system and components.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. The term "comprising" is not intended to be limiting and merely suggest that exemplary recitations are present, but that they may be integrated into a single component, separated into distinct components, or may be used in conjunction with any other combination of components. Therefore, comprising may be considered synonymous with "including" and does not mean "consisting only of". In addition, any description of the prior art, background, or conventional systems should not be taken as an indication that the prior art forms part of the common general knowledge. Each of the applications cited herein are incorporated by reference in their entirety.

What is claimed is:

1. A fast tracking module for use in free space optical communications, comprising:
    an alignment optic that includes a wave front sensor;
    a motion stage supporting the alignment optic;
    a fixed link stage supporting the motion stage;
    a plurality of actuators connected to the motion stage and the fixed link stage that move the motion stage relative to the fixed link stage; and
    a controller that receives input signals representing light incident on the wave front sensor and sends output signals to the actuators to position the motion stage based on the input signals such that the alignment optic receives an optical beam.

2. The fast tracking module of claim 1, wherein the alignment optic comprises a multi-mode fiber that transmits and receives optical beams.

3. The fast tracking module of claim 1, wherein the wave front sensor comprises a plurality of cells for detecting light, configured to determine an alignment of a received optical signal on the wave front sensor.

4. The fast tracking module of claim 1, wherein the controller creates a feedback loop, the controller optically coupled to receive optical data from the alignment optic and electrically coupled to the motion stage such that optical signals received by the controller are used by the controller to manipulate the actuators to control a position of the motion stage.

5. The fast tracking module of claim 1, wherein the wave front sensor comprises a quad cell with a hole.

6. The fast tracking module of claim 1, wherein the plurality of actuators translate the motion stage in a plane perpendicular to a received optical path of the optical beam.

7. The fast tracking module of claim 1, further comprising an intermediate stage with links that physically link to the motion stage and physically link to the fixed link stage.

8. The fast tracking module of claim 7, wherein the links of the fast tracking module are configured to maintain the motion stage in a plane generally perpendicular to the received optical path of the optical beam.

9. The fast tracking module of claim 1, wherein the plurality of actuators comprise a voice coil actuator.

10. The fast tracking module of claim 6, wherein the fast tracking module comprises four actuators where two actuators translate the motion stage along a first axis and two actuators translate the motion stage along a second axis, the second axis perpendicular to the first axis.

11. The fast tracking module of claim 8, comprising first flexure links between the motion stage and the intermediate stage and second flexure links between the intermediate stage and the fixed link stage.

12. The fast tracking module of claim 11, wherein each of the first flexure links and second flexure links comprise approximately a same length.

13. The fast tracking module of claim 12, wherein the first and second flexure links comprise rods to permit motion in the perpendicular axis.

14. The fast tracking module of claim 1, wherein the plurality of actuators translate the motion stage in an axis parallel to an optical path of the optical beam to focus the received optical beam on the alignment optic.

15. The fast tracking module of claim 1, further comprising a focusing optic that the optical beam passes though, the focusing optic coupled to a motor such that the focusing optic translates in a direction parallel to an optical path of the optical beam to focus the optical beam on the alignment optic.

16. The fast tracking module of claim 1, further comprising:
    flexure links physically connected to the motion stage and the fixed link stage.

17. The fast tracking module of claim 16, wherein the orientation of the flexure links maintain the motion stage in a plane generally perpendicular to a received optical path of the optical beam.

* * * * *